United States Patent [19]
Macharg

[11] 3,987,353
[45] Oct. 19, 1976

[54] CONTROL SYSTEMS FOR BATTERY CHARGERS

[76] Inventor: James Adrian Macharg, Mancroft House, Melbury Road, Newcastle-upon-Tyne 7, England

[22] Filed: Nov. 20, 1974

[21] Appl. No.: 525,551

[30] Foreign Application Priority Data
Dec. 21, 1973 United Kingdom............... 59626/73

[52] U.S. Cl................................... 320/39; 320/21; 320/46
[51] Int. Cl.² ........................................... H02J 7/10
[58] Field of Search .............................. 320/21–24, 320/39, 40, 48, 46

[56] References Cited
UNITED STATES PATENTS
3,886,428   5/1975   Macharg.......................... 320/21 X

*Primary Examiner*—J D Miller
*Assistant Examiner*—Robert J. Hickey
*Attorney, Agent, or Firm*—Toren, McGeady and Stanger

[57] ABSTRACT

A battery charger control system in which the charging current is switched on and off at repetitive intervals, the open circuit terminal voltage during the "off" periods being utilized to provide a control signal in order to vary the magnitude of the charging current during the "on" periods. The control signal is derived by extracting the resultant "I.R. Drop" at the battery terminals once the charging current has been switched off and then differentiating the rate of decay of the open-circuit terminal voltage of the battery. A voltage is then derived from the differential and used in one of three ways to control the magnitude of the charging current in order to progressively reduce its magnitude once gas generation has been detected as a result of a significant differential occuring.

26 Claims, 12 Drawing Figures

CONTROL SYSTEMS FOR BATTERY CHARGERS

The present invention relates to control systems for battery chargers. One such control system has been disclosed in the Specification of my U.S. Pat. No. 3,886,428.

The control system disclosed in the above referred to co-pending Application includes: means for switching on and off the charging current at repetitive intervals in order to provide an open-circuit terminal voltage during the "off" periods; means for providing a signal for controlling the magnitude of the charging current; means for extracting the resultant I.R. Drop at the battery terminals; means for differentiating the rate of decay of the open-circuit terminal voltage of the battery during the said repetitive intervals; means for deriving a voltage which is some function of the differential at the repetitive intervals; means for comparing this voltage derived from the differential with a standard voltage; and means utilizing the difference between said two voltages in order to modify the control signal whereby the magnitude of the charging current is controlled.

In the embodiment described in my U.S. Pat. No. 3,886,428, the means for switching on and off the charging current is a timer which controls a switched output stage to switch on and off the charging current at regular intervals. The quantity of charging current passed through the output stage is controlled by variation of the percentage degree of conduction of the thyristors in the output stage. The control signal which effects such a control is derived from the comparison of the differential voltage with a standard voltage.

The extraction of the I.R. Drop as a result of the circuits disclosed in the above numbered co-pending Application, enables the Gas Drop to be utilized in the control of the rate of charging of the battery.

As has been stated in the preamble of the Specification of the above numbered patent, it is believed that the "Gas Drop" is a rapid exponential function and that the "Settling Rate" is a slow exponential function, the combination of the two, once the I.R. Drop has been removed, appearing to approximate to a rectangular hyperbola.

It is believed that the rates of decay of the two portions of the curve vary with state of charge, state of settle, and temperature of the battery. When the battery is discharged, it accepts charge easily, and for this reason little or no gas is generated. Hence, the Gas Drop is almost nonexistent. As the battery charges up, a point will be reached at which it cannot accept charge at the rate it is being applied and in consequence gas commences to be generated.

As charging continues, a point of complete polarization will be reached, and the potential difference of the gas layer reaches a peak so that the Gas Drop is at its most rapid rate. Further charging at the same current or a higher current thickens the gas layer, so providing gas which must be reabsorbed before the area of polarization can be rapidly reduced, and hence the Gas Drop is not so rapid.

At higher temperatures the active materials are more active whilst at lower temperatures the converse is the case. Thus, when a battery is at a higher temperature than normal, it will accept charge more easily and in consequence will charge more quickly and more completely before gassing commences. Conversely, when a battery is at a lower temperature than normal, it will charge more slowly and less before gassing commences.

Whatever the temperature, any adequate value of charging current will sooner or later produce a peak rate of decay of Gas Drop, whilst further charging at this value of current will lessen the rate of decay of Gas Drop. In every case, the peak rate of decay represents total polarization of the electrode area. As the battery charges up, the peak rate of decay will itself reduce because the electrodes will have more and more difficulty in reabsorbing gas.

With regard to the instantaneous drop of terminal voltage due to the cessation of current through the ohmic resistance of the battery, loosely called the I.R. Drop, this will tend to be high in the early stages of charging if the terminal current is held high in order to speed charging, more especially if any sulphation is present in the electrodes. It may also tend to rise if the gas layer is complete, the gas acting rather like an insulator, but this effect tends to be offset in practice because as the battery charges up, a lower and lower terminal current is called for to maintain a complete gas layer.

Because the I.R. Drop is not only great relative to the Gas Drop, but it is also much more constant, it is embarrasing during examination of the decay of terminal voltage, and serves no useful purpose. For this reason, it is extracted in the control system disclosed in my U.S. Pat. No. 3,886,428. The Gas Drop on the other hand can supply information not only as to the degree of polarization, but also as to the state of charge of the battery, in that the very existence of a significant Gas Drop can be utilized to indicate that the battery is approaching full charge.

Thus, by detecting the magnitude of the Gas Drop electronically, a control signal may be formed to control the quantity of charging current passed during an ON period by the thyristor control circuit, thus bringing about a reduction in charging current to maintain gassing at a minimum rate. Furthermore, if consecutive detected Gas Drops are analysed electronically in a comparative manner, it will then be possible to detect the point in time at which complete polarization has been reached.

It is therefore an object of the present invention to provide a control system for a battery charger in which the Gas Drop at the battery terminals may be detected and utilized to control the charging current. It is a further object to analyze consecutive detected Gas Drops in order to determine the point of complete polarization.

According to the present invention there is provided a control system for a battery charger including: means for switching on and off the charging current at repetitive intervals in order to provide an open-circuit terminal voltage during the off periods; means for providing a signal for controlling the magnitude of the charging current; means for varying said signal between a maximum to provide maximum charging current and a minimum to provide minimum charging current; means for extracting the resultant I.R. Drop at the battery terminals; means for differentiating the rate of decay of the open-circuit terminal voltage of the battery due to the Gas Drop at the said repetitive intervals; means for deriving a voltage from said differential during the repetitive intervals; means for utilizing said voltage derived from the differential to cause said control signal varying means to vary said control signal in order to progressively reduce the magnitude of the charging current once gassing has commenced.

In one preferred form, the voltage derived from the differential is stored with decay, this function being used to control the means for varying said control signal in order to bring about a reduction in charging current once gas generation has been detected.

In a second preferred form, the voltage derived from the differential is stored and utilized to control an AND gate, the means for switching on and off the charging current also controlling said AND gate whereby if gas generation has been detected the AND gate controls the means for varying the control signal in order to bring about a reduction in charging current.

In a third preferred form, the control system additionally includes means for storing the voltage derived from the differential, means for detecting a rise of the differential in the next cycle, means for storing the detected rise, and means for preventing the charging current being reduced as a result of a detected differential due to Gas Drop until the peak differential has been reached.

The present invention will now be described in greater detail by way of examples with reference to the accompanying informal drawings, wherein.

Figure 1:
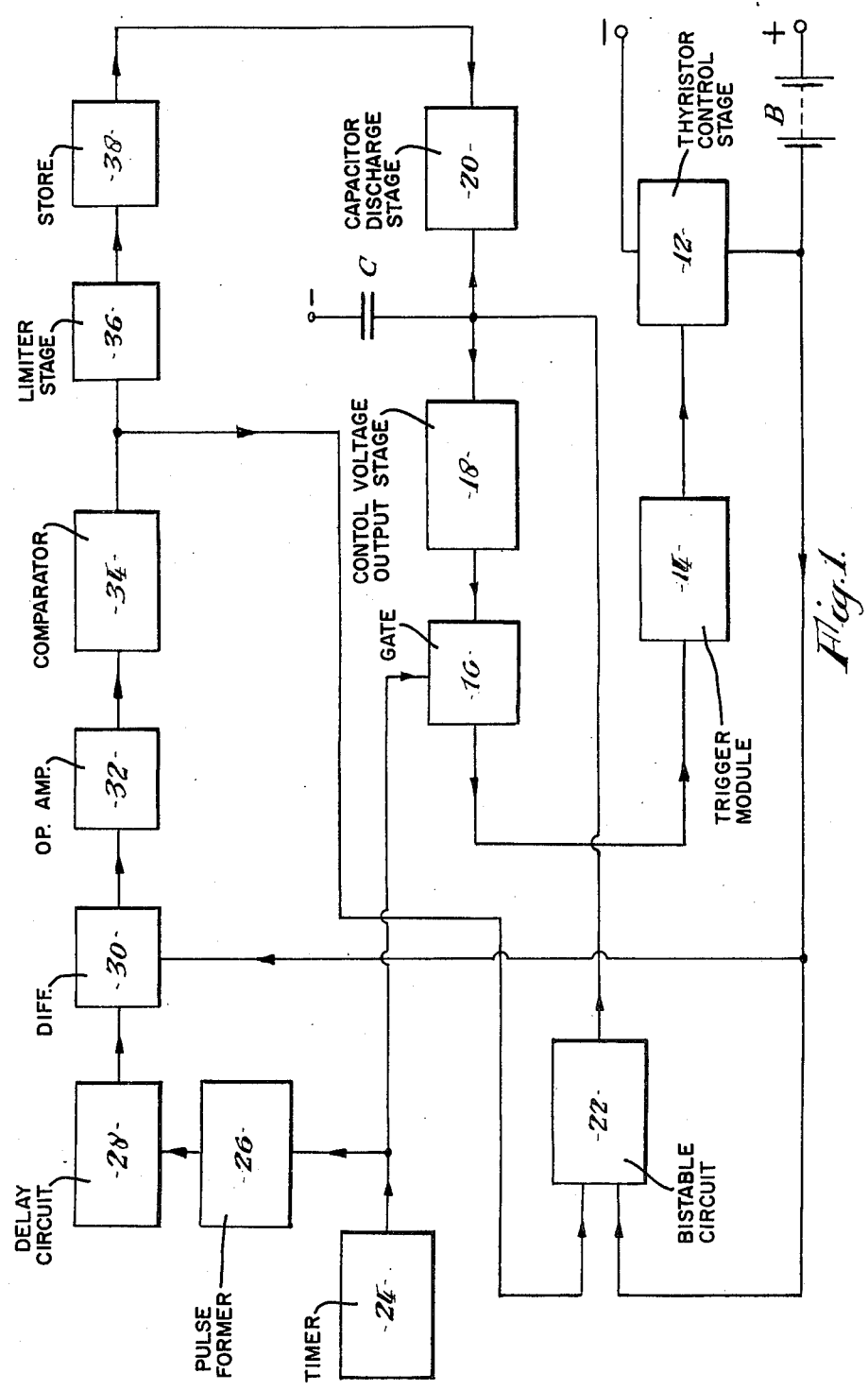
FIG. 1 is a block diagram of a first preferred form of control system operating on the principle of gas prevention.

Referring first to FIG. 1, the first preferred form of control system for charging a battery B includes a thyristor control stage 12, a trigger module 14, a gate or switch 16, a control voltage output stage 18, a capacitor C, a capacitor discharge stage 20, a bistable circuit 22, a timer 24, a pulse former 26, a delay circuit 28, a differentiator 30, an operational amplifier 32, a comparator 34, a limiter stage 36, and a store 38 which is allowed to discharge to provide a control signal for the capacitor discharge stage 20.

The trigger module 14 may be operated in the mode of either phase control wherein varying portions of cycles of current are conducted, or zero current switching wherein current is reduced by omitting entire half cycles.

The thyristor control stage 12 is in series with the battery across a source of charging current. The gate electrodes of the thyristors, which control the conduction of the thyristors are connected to the trigger module 14, which in turn is controlled from the control voltage output stage 18, when the gate 16 is open. The gate is controlled from the timer 24 which is adjusted to provide predetermined ON and OFF periods for the charging current. Thus, when the gate 16 is blocked, no output voltage is supplied to the trigger module 14 and the gate electrodes of the thyristors are controlled so as to prevent any conduction of charging current to the battery B, during an OFF period of the timer 24. Conversely, when the gate 16 is open, the controlled voltage output stage provides a signal to determine the amount of conduction of the thyristors and hence the quantity of charging current passed to the battery.

The control voltage output stage 18 provides a voltage signal whose magnitude is a function of the charge stored in the capacitor C. The capacitor C is initially charged to a limit value. The capacitor discharge circuit 20 is arranged to partially discharge the capacitor C in degrees from the limit value during each cycle in accordance with the command it receives. The control voltage output stage 18 thus provides a signal to control the conduction of the thyristors which is directly dependent on the amount of the charge left in the capacitor after being partially discharged by the circuit 20.

The bistable circuit 22 is provided to hold the capacitor C charged until gas has been sensed. It receives one input from the battery terminal voltage and another input from the comparator 34. Its precise operation will be described in greater detail with reference to FIG. 5 of the drawings. It will suffice to mention here that as long as no gas has been sensed by the analysis carried out by the electronic circuits shown in any one of the embodiments shown in FIGS. 1 to 3, it will hold the capacitor C charged so that the control voltage output stage 18 allows the largest quantity of charging current to pass to the battery. As soon as gas has been sensed, the bistable circuit 22 will switch to its other state, which will allow the capacitor discharge circuit 20 to partially discharge the capactior C, thus reducing the quantity of charging current.

The command signal which controls the capacitor discharge circuit 20 is obtained from the differentiator 30 shortly after the commencement of each OFF period. A signal from the timer 24 is applied at the beginning of each off period to the differentiator to cause the differentiation of the terminal voltage in a manner which will be explained later. This signal passes through the pulse former 26 where it is shaped and is delayed a given amount in the delay circuit 28. The delay provided by the delay circuit 28 is sufficient to allow the terminal voltage to drop after the charging current has been switched off to a point where the I.R. Drop has been extracted and the Gas Drop has started. Thus the differentiator 30 is only actuated to differentiate the open-circuit terminal voltage of the battery once the I.R. Drop has been effectively extracted. The output from the differentiator 30 is applied to the operational amplifier 32.

The circuits shown in the blocks 26–32 are common to the first, second and third embodiments shown in respectively, FIGS. 1, 2 and 3 and are shown and described in greater detail hereinafter with reference to FIG. 8.

The output from the operational amplifier 32 which includes the significant differential value of the Gas Drop is applied to the comparator 34. The use of the word significant is due to the fact that it will inevitably include a small amount due to the Settling Rate. To remove this error the comparator utilizes a transistor whose base-emitter drop can offset this error introduced due to the Settling Rate. The output from the comparator 34 is limited by the limit circuit 36 and then applied to store with decay circuit 38. These three circuits will be described hereinafter in greater detail with reference to FIG. 8. It will suffice to mention that the purpose of this circuit is to store a significant signal from the differentiator in a capacitor, this being done by charging the capacitor to a fixed level, each time there is a significant output from the differentiator 30. This capacitor is allowed to discharge through a resistor and its voltage is used to control the capacitor discharge circuit 20.

Figure 2:
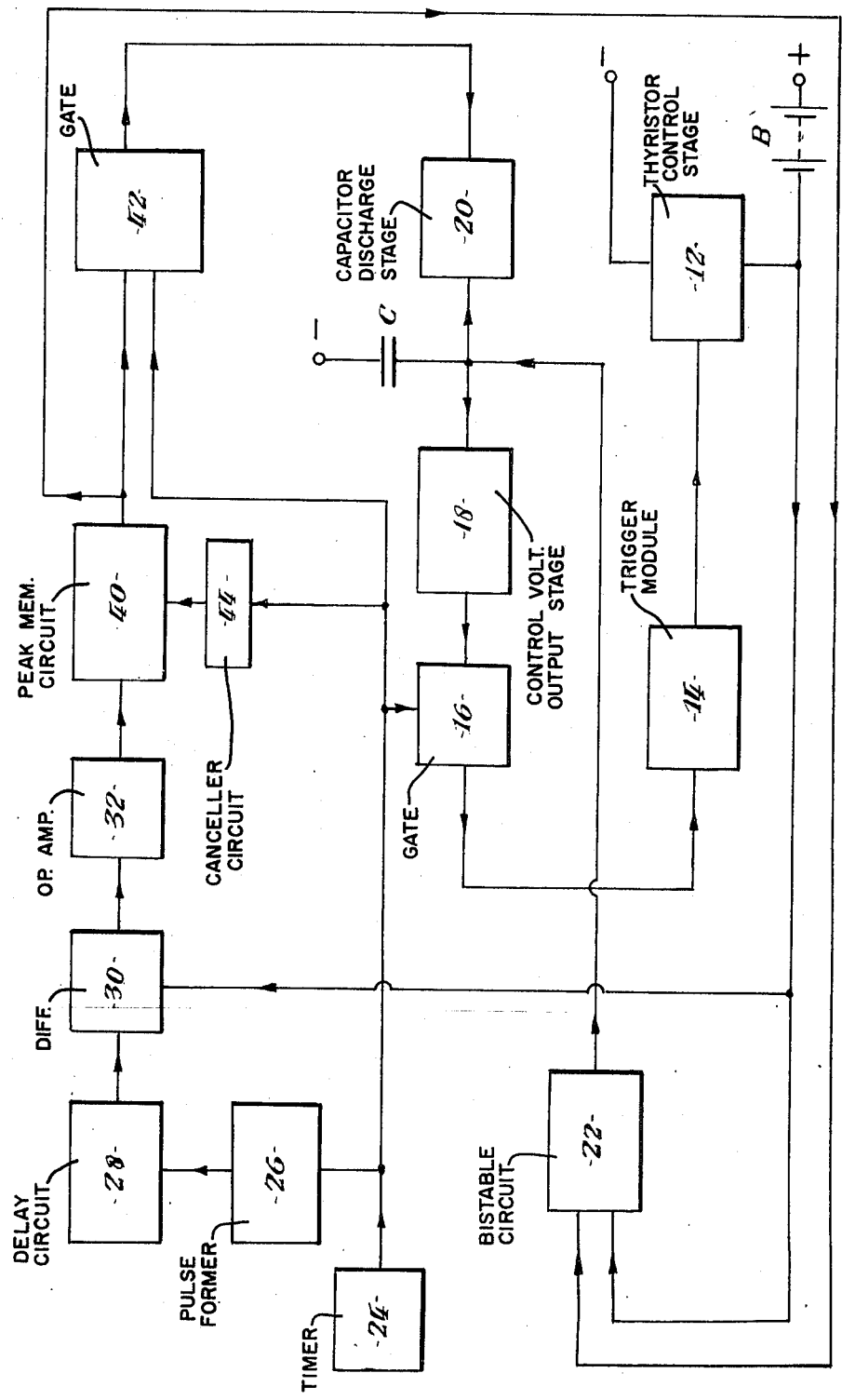
FIG. 2 is a block diagram of a second preferred form of control system also operating on the principle of gas prevention.

Turning now to FIG. 2, it will be appreciated that the second embodiment also utilizes the blocks 12 to 32 which are identical with those shown in FIG. 1. Instead of the comparator 34, the limit circuit 36 and the store with decay circuit 38, the schematic diagram shows that the output from the operational amplifier is applied to a peak memory circuit 40, which also incorporates a comparator and reference. The output from this peak memory circuit 40 is applied to one input of an AND gate 42. The second input of the AND gate 42 receives a signal from the timer 24. The peak memory circuit 40 is associated with a canceller circuit 44 in order to cancel the peak voltage remembered in the circuit 40 during each cycle. The actuation of the canceller circuit 44 to effect the cancellation of the peak voltage remembered from a signal supplied by the timer 24. Alternatively, the signal could be supplied from the AND gate 42. An output from the AND gate 42 is also applied to the capacitor discharge circuit 20. The output from the peak memory circuit 40 is also applied to the first input of the bistable circuit 22 as a gas sensed signal. The circuits of the peak memory 40 and the canceller 44 are shown in greater detail when the third embodiment is described.

Figure 3:
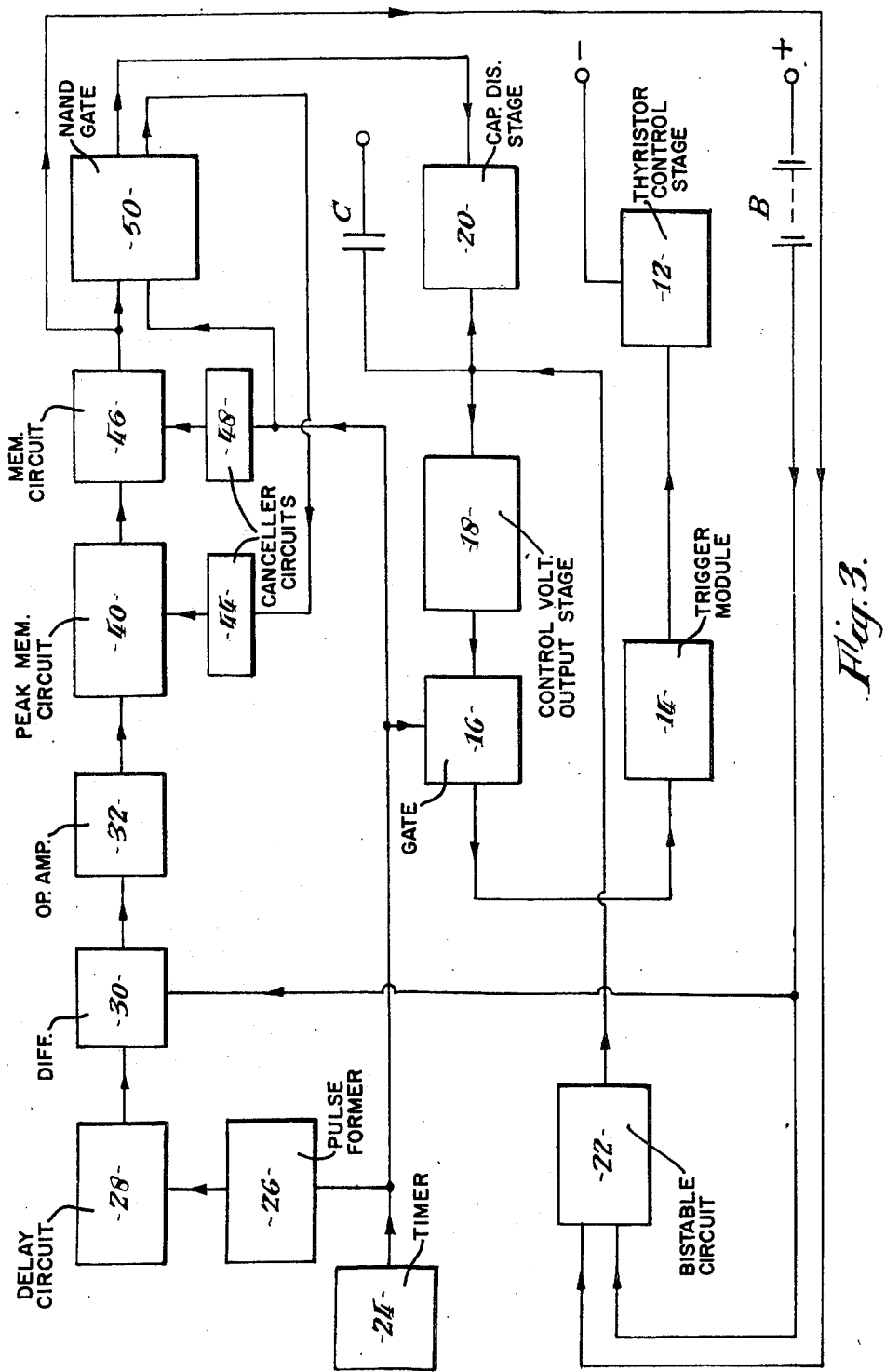
FIG. 3 is a block diagram of a third preferred form of control system utilizing the sensing of complete polarization.

The third embodiment shown in FIG. 3 differs from the other two embodiments in so far as it is more concerned with detecting the point of complete polarization rather than detecting a significant differentiated voltage derived from the decay of the terminal voltage with the I.R. Drop extracted. As in the case of FIG. 1, this embodiment includes the blocks 12 to 32.

In common with FIG. 2, this circuit also includes the peak memory circuit 40, again also incorporating a comparator and reference, and the peak memory circuit canceller 44. The output from the peak memory circuit 40 is applied to a rise detector and memory circuit 46. This circuit 46 has associated with it a second canceller circuit 48 in order to cancel the detected rise which has been remembered. The output from the rise detector and memory circuit 46 is applied to a first input of a NAND gate 50, whose second input receives signals from the timer 24. A first output from the NAND gate 50 is applied to the capacitor discharge circuit 20 shown in FIG. 1, whilst a second output is used to actuate the canceller 44. The canceller 48 is actuated cyclically from the timer 24. The output from the rise detector and memory circuit 46 is also applied to an input of the bistable circuit 22, and forms a gas sensed signal.

Figure 9:
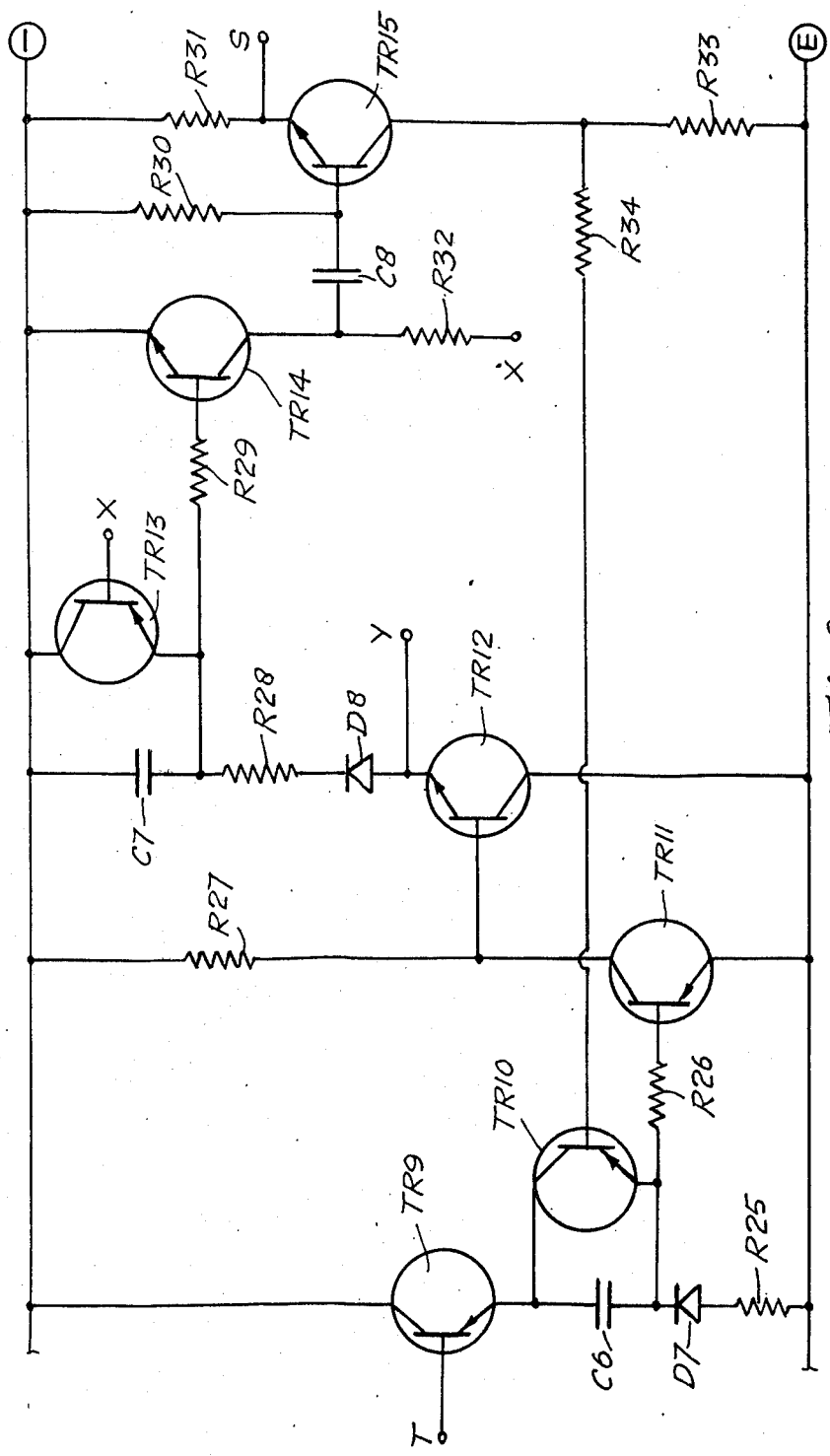
FIG. 9 is a circuit diagram of some of the blocks shown in FIG. 3 including the peak memory and canceller, the rise detector memory and canceller and NAND gate.

Detailed circuits of the blocks 40, 44, 46, 48 and 50 are shown in FIG. 9 and will be described in greater detail hereinafter with reference thereo.

Having now described the three embodiments in block form, we can now concentrate on the detailed circuits.

Figure 4:
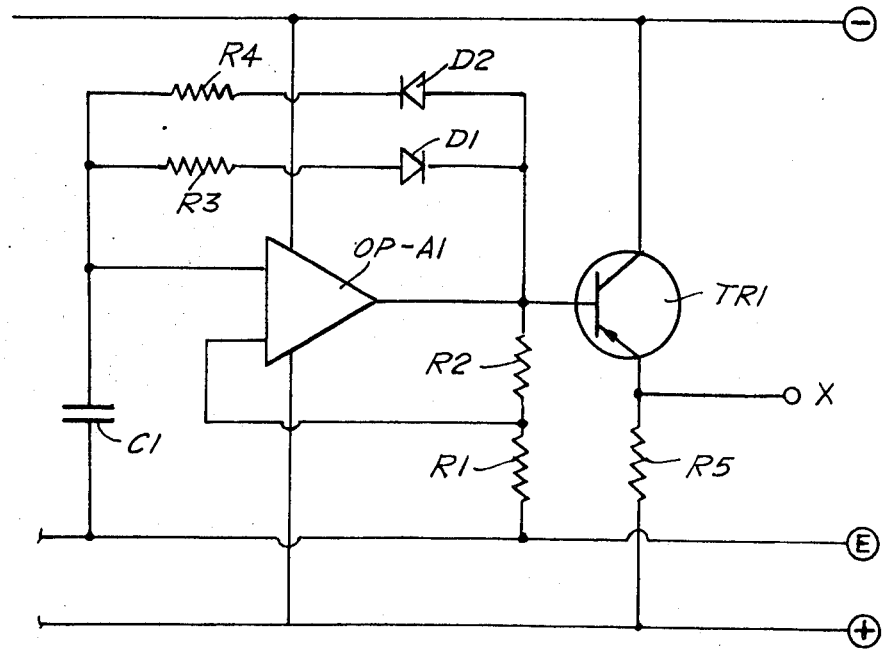
FIG. 4 is a circuit diagram of one form of timer circuit used in that part of the control system which is common to all three embodiments.

The circuit of the timer 24 is shown in greater detail with reference to FIG. 4. The timer 24 includes an operational amplifier OP-A1, a PNP transistor TR1, diodes D1 and D2, a capacitor C1 and resistors R1 to R5. The output of the operational amplifier OP-A1 appears across a load consisting of the resistors R1 and R2 in series, feedback being applied from their junction to the non-inverting input of the amplifier. The capacitor C1 is connected between the inverting input of the amplifier and the earth line, and is alternately charged and discharged through the diode D2 and the resistor R4, and the diode D1 and the resistor R3. The ratio of the resistances of the resistors R3 and R4 decides the ON-OFF ratio of the timing circuit, whilst the cycle time is controlled by the values of the resistors R1 and R2.

The output from the operational amplifier OP-A1 is also applied to the base electrode of the transistor TR1, the resistor R5 being in series with the emitter-collector path across the D.C. supply. When the transistor TR1 is non-conductive, the voltage at the output terminal X is positive with respect to earth and when the transistor TR1 is conductive, the voltage at the terminal X is negative with respect to earth. These positive and negative signals appearing at the terminal X of the timer thus determine whether the charging current is ON or OFF.

Figure 5:
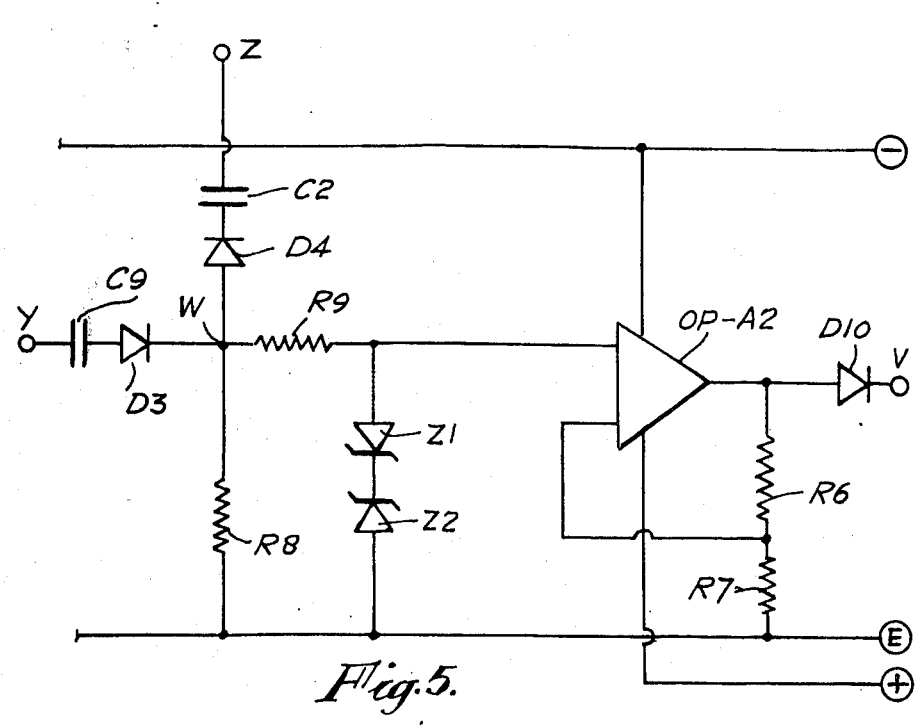
FIG. 5 is a circuit diagram of one form of bistable circuit used in the common part of the control system.

The circuit of the bistable 22 is shown in greater detail with reference to FIG. 5. The bistable includes an operational amplifier OP-A2, resistors R6 to R9, diodes D3, D4 and D10, zener diodes Z1 and Z2 and capacitors C2 and C9. Resistors R6 and R7 are connected in series between the output of the operational amplifier OP-A2 and earth, positive feedback being applied from their junction to the non-inverting input of the amplifier. The zener diodes Z1 and Z2 are connected in back-to-back relation between the inverting input of the operational amplifier OP-A2 and earth. The resistor R9 is connected between the inverting input and a common point W. The resistor R9 in conjunction with the zener diodes Z1 and Z2 act to protect the operational amplifier OP-A2 from extreme transient voltages. Control signals are applied to the inverting input of the amplifier either from terminal Z through the capacitor C2 and the diode D4 or from the terminal Y through the capacitor C9 and the diode D3. A negative going pulse is applied to the inverting input of the amplifier through the terminal Z. This negative pulse in one preferred form is obtained from the negative terminal when the battery is first connected into the circuit. In an alternative form this negative going pulse could be produced in other ways as for example by closing a switch connecting the terminal Z to a negative source. A positive going pulse is applied to the inverting input of the amplifier through the terminal Y. As shown, this can be obtained from the output of the comparator 34 (FIG. 1), or the peak memory circuit 40 (FIGS. 2 and 3).

The sensitivity of the bistable 22 would be adjusted so that changes of battery terminal voltage due to the turning on and off of the charging current under the action of the timer 24, would have no effect. A negative going pulse on the terminal Z will provide a stable positive output voltage at the output terminal V of the operational amplifier OP-A2 with respect to earth. When a positive going pulse appears at the terminal Y it will change the state of the bistable 22 so that a negative output signal is present at the output terminal V.

The output at the terminal V of the bistable 22 controls the charging of the capacitor C, a positive voltage allowing the capacitor to be charged up through the diode D10. This process will be described more fully later on.

Figure 6:
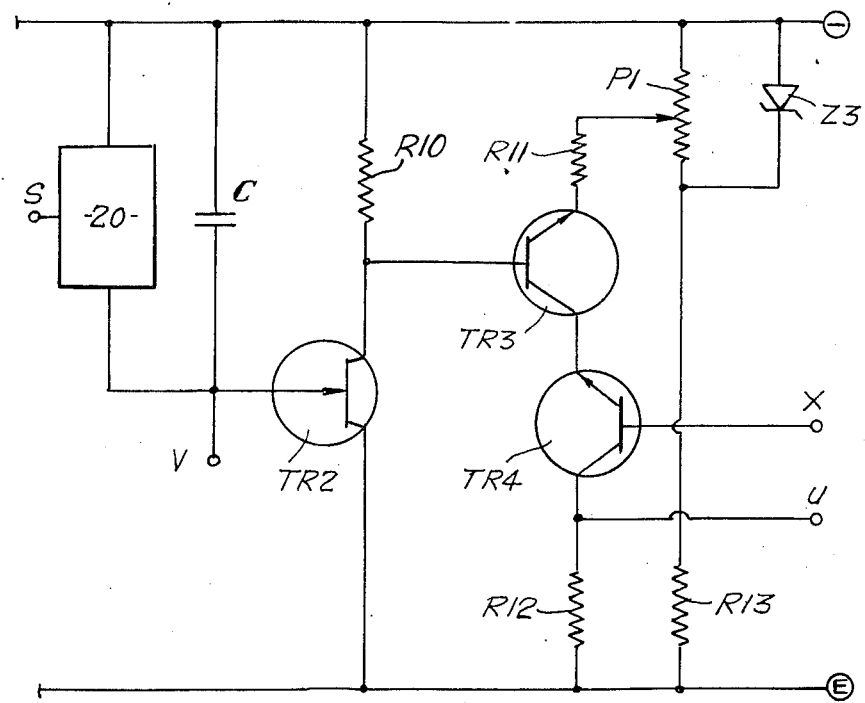
FIG. 6 is a circuit diagram of the controlled voltage output stage used in all these embodiments.

The circuit of the control voltage output stage 28 is shown in greater detail in FIG. 6. The circuit includes a field-effect transistor TR2, two NPN transistors TR3 and TR4, resistors R10 to R13, a potentiometer P1 and a zener diode Z3. The capacitor C and the capacitor discharge circuit 20 are also shown.

The voltage across the capacitor C is applied to the gate electrode of the field-effect transistor TR2. The resistor R10 is in series with the drain-source path of the transistor TR2 across a negative D.C. voltage supply. The output from the field-effect transistor TR2 is applied to the base electrode of the transistor TR3. The resistors R11 and R12 are in series with and on respective sides of the emitter-collector paths of the transistors TR3 and TR4, the other end of the resistor R12 is connected to earth whilst the other end of the resistor R11 is connected to the negative terminal of the D.C. supply through the tap of the potentiometer P1. The zener diode Z3 shunts the potentiometer P1 and is in series with the resistor R13.

The base electrode of the transistor TR4 is connected to the terminal X of the timer 24, and an output from the control voltage stage 18 is obtained from terminal U connected to the collector electrode of the transistor TR4.

The field-effect transistor TR2 forms a stage having a high input impedance and a low output impedance. The transistors TR3 and TR4 form a composite stage having the ability to turn off the resultant control voltage at the terminal U in order to prevent the thyristors in the thyristor control stage 12 from firing.

When the timer 24 provides a positive going signal at the terminal X, it effectively switches on the transistor TR4, this transistor conducting if the transistor TR3 is biassed for conduction. Under these conditions a voltage is built up across the resistor R12 which then forms the control voltage on terminal U for the trigger module 14. When a negative going signal appears at the terminal X, the transistor is switched to the non-conductive state so that the voltage on the terminal U is at earth potential, with the result that the trigger module 14 prevents the conduction of the thyristors in the thyristor control stage 12.

Assuming that the battery is being charged and the timer is ON to allow charging current to flow into the battery, the transistor TR4 will be in the fully conducting state and providing the transistor TR3 is also fully conducting a maximum control voltage is available across the resistor R12. The thyristors are thus fully conductive. The conduction of the thyristors can be reduced progressively by the transistor TR3 being progressively turned off. When the capacitor C is charged to its maximum voltage, the field-effect transistor TR2 conducts fully, thus providing maximum bias voltage across the resistor R10 to the base electrode of the transistor TR3. This means that the transistor TR3 is also fully conductive resulting in maximum output at the terminal U and hence maximum conduction of the thyristors. These conditions arise when the battery is nearly fully discharged and can thus accept the maximum current for the ON period. As the battey becomes more fully charged, the voltage across the capacitor C gets notched down in stages, resulting in a reduced conduction of the field-effect transistor TR2 which in turn reduces the bias on the transistor TR3 to also cause it to reduce its conduction. The control voltage signal appearing at the terminal U is reduced resulting in a reduction of the conducting period of the thyristors and hence a reduction in the charging current.

This notch down of the voltage across the capacitor C is progressive once the bistable 22 has changed to the state where the output is negative. Whilst the output from the bistable 22 is positive it prevents discharge of the capacitor C during the ON period even if the capacitor discharge circuit has during the preceding OFF period attempted to notch down the voltage across the capacitor C in response to a signal from the block 38 (FIG. 1), the AND gate 42 (FIG. 2) or the NAND gate 50 (FIG. 3).

Figure 7:
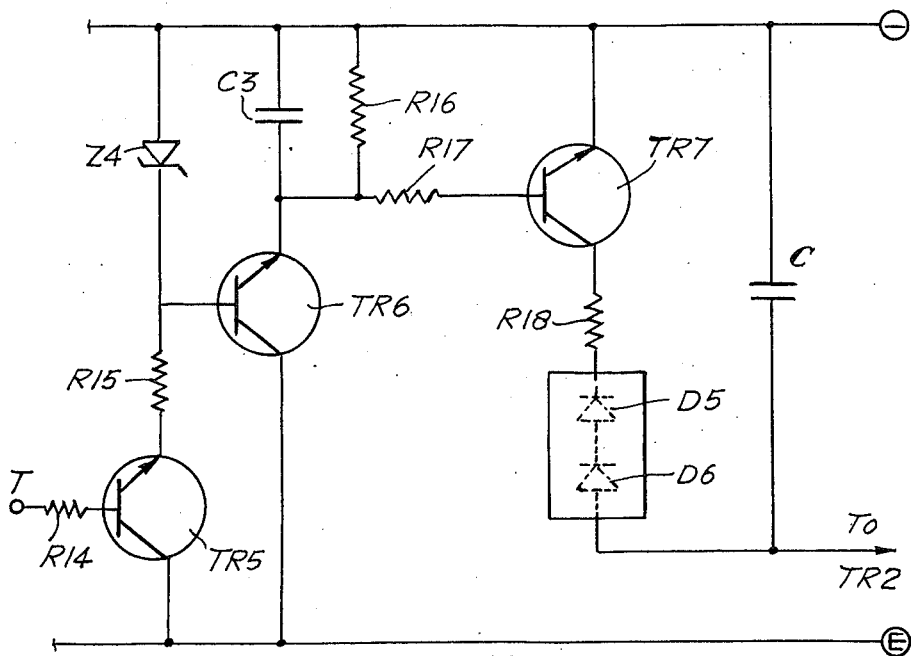
FIG. 7 is a circuit diagram of a first form of capacitor discharge stage which is utilized in the first embodiment shown in FIG. 1.

One preferred form of circuit of the capacitor discharge stage 20 is shown in greater detail in FIG. 7 together with the blocks 34 to 38 of FIG. 1. The circuit includes transistors TR4, TR6 and TR7, resistors R14 to R18, a capacitor C3, a zener diode Z4 and a diode string shown as consisting of diodes D5 and D6. The notch down discharge of the capacitor C is effected through the transistor TR7, the resistor R18 and the diode string D5–D6. The output from the operational amplifier 32 appears at terminal T and is applied to the base electrode of the transistor TR5 through the resistor R14. The zener diode Z4, resistor R15 and the collector-emitter path of the transistor TR5 are connected between the negative terminal of the D.C. supply and earth. The junction between the zener diode Z4 and the resistor R15 is connected to the base electrode of the transistor TR6. The capacitor C3 and resistor R16 which act as a store with decay are each connected in series with the collector-emitter path of the transistor TR6. The voltage across the capacitor C3 is applied to the base electrode of the transistor TR7 through the resistor R17.

If the output of the operational amplifier 32 is significant relative to the base-emitter voltage of the transistor TR5, the excess is amplified by the transistor TR5 and limited in height by the zener diode Z4 to provide a constant signal if a significant differential is present. This constant signal is fed to the base electrode of the transistor TR6 arranged as an emitter follower stage. The capacitor C3 is thus charged to a fixed level every time a significant differential is present. The capacitor C3 discharges slowly through the resistor R16, and the decaying voltage across the capacitor C3 is used to control the bias voltage at the base of the transistor TR7 through the resistor R17, and hence its conduction. The transistor TR7 controls the rate of discharge of the capacitor C.

The rate of discharge of the capacitor C will be a function of the voltage across the capacitor C and will be in exponential steps. If no significant differential is detected, then the capacitor C3 is not charged up and no voltage is applied to the base electrode of the transistor TR7, resulting in no conduction and no notch down discharge of the capacitor C. When a significant differential is detected, the capacitor C3 is charged to the fixed level and causes the transistor TR7 to conduct and start to discharge the capacitor C. Due to the fact that the voltage across the capacitor C3 decays the transistor TR7 will again be blocked once the voltage has decayed to its base-emitter voltage. Due to the high value of the resistor R18, only a small discharge of the capacitor C in fact occurs per cycle. However, if significant differentials continue to be detected, the notch down process proceeds stage by stage, small exponential discharges occurring through the transistor TR7 at each OFF period.

The exponential discharge is advantageous, because some gassing is called for eventually, in order to complete the charge and mix the electrolyte. If the rate of reduction of charging current becomes too slow, gas will commence to be generated and can be detected. If some gassing is to occur in order to complete the charge, then the charging current must level out at a given minimum value, to which there must be a corresponding minimum value of voltage across the capacitor C. In practice, this minimum value of voltage may be say 1.2 volts. When the transistor TR7 is conducting, its collector-emitter voltage will be about 0.2 volts and by using a silicon diode for D5 and a germanium diode for D6, the combined voltage drop is 0.7 + 0.3 = 1.0 volts which makes a total voltage of 1.2 volts across the capacitor C.

Therefore, when gassing occurs, and a significant differential is detected during each OFF period, the voltage across the capacitor C is exponentially notched down in steps to 1.2 volts but no further. The overall effect will be gas prevention until the charging current has been reduced to a safe level.

Figure 8:
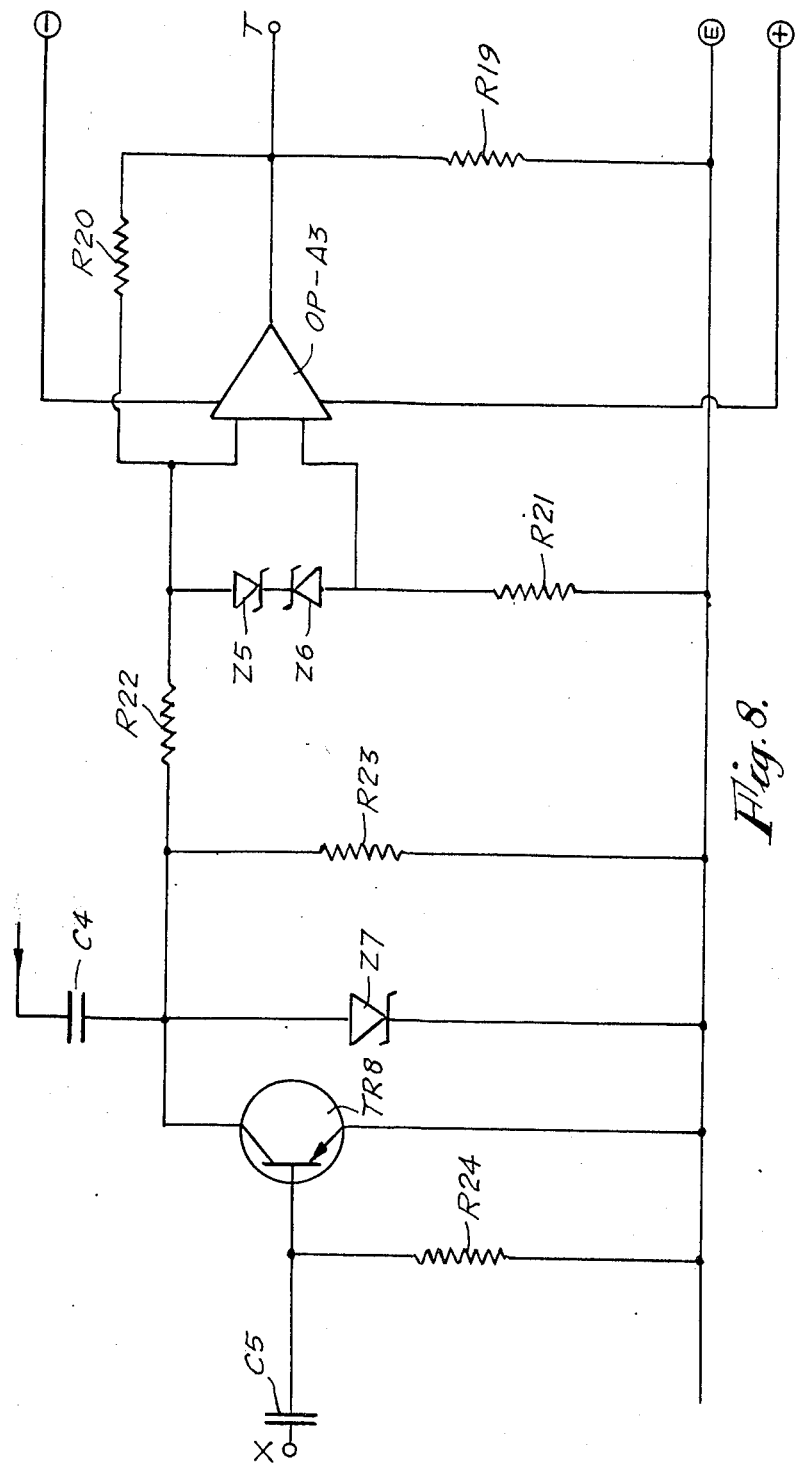
FIG. 8 is a circuit diagram of the pulse former, differentiator and amplifier which are common to the three embodiments.

Referring now to FIG. 8, the operational amplifier 32 is shown in greater detail and the amplifier proper is referenced OP-A3. The circuit also includes a pair of back-to-back zener diodes Z5 and Z6 connected across the two inputs, and resistors R19 and R22. The differentiator 30 comprises a capacitor C4 and resistor R23 connected in series between the negative terminal of the battery and earth. The pulse former comprises a capacitor C5 and resistor R24 whilst the delay circuit effectively comprises a transistor TR8. A zener diode Z7 acts as a limit and is connected across the resistor R23 as is the emitter-collector path of the transistor TR8.

When a negative going edge is generated by the timer 24, it is applied to the base electrode of the transistor TR8 via the capacitor C5. The transistor TR8 is rendered conductive by the shaped pulse so formed and effectively short circuits the differentiating resistor R23. Because the thyristors will continue to conduct charging current into the battery until approaching the end of the half cycle during which the timer may turn off the control voltage, the resistor R23 is short circuited by the transistor TR8 for at least one half cycle of the mains supply frequency so that the I.R. Drop can be extracted before differentiation occurs. At this instant the negative going edge from the timer which is differentiated by the capacitor C5 ceases and the transistor TR8 is rendered non-conductive.

If now the battery voltage decays further due to the Gas Drop, this decay will be differentiated by the capacitor C4 and resistor R23. The resulting differentiated signal will then be amplified by the operational amplifier OP-A3 and applied to terminal T of the comparator 34, in the case of the first embodiment or to the peak memory circuit 40 in the case of the second and third embodiments.

The circuits which make up the peak memory circuit 40, the rise detector and memory 46, the NAND gate 50 and the two cancellers 44 and 48 will now be described in greater detail with reference to FIG. 9. The peak memory circuit comprises a transistor TR9, a capacitor C6, a diode D7 and a resistor R25, the latter three components being connected in series with the collector-emitter path of the transistor TR9 between earth and the negative terminal of the D.C. supply. The peak memory canceller comprises a transistor TR10, whose emitter-collector path is connected across the capacitor C6 which acts as the peak memory. The base electrode of this transistor TR10 is connected to an output of the NAND gate 50.

The rise detector and memory comprise transistors TR11 and TR12, resistors R26 to R28, diode D8 and memory capacitor C7. The canceller 48 comprises a transistor TR13. The NAND gate 50 comprises transistors TR14 and TR15, resistors R29 to R34 and a capacitor C8. An output terminal S from the emitter electrode of the transistor TR15 is connected direct to the capacitor discharge stage 20 (FIG. 6).

The voltage across the diode D7 and resistor R25 is applied to the base electrode of the transistor TR11 via the resistor R26, the voltage representing a rise, due to the fact that the capacitor C6 must be further charged. This detected rise is amplified by the transistors TR11 and TR12. In series with the collector-emitter path of the transistor TR12 between the emitter electrode and the negative terminal of the D.C. supply are the diode D8, resistor R28 and the capacitor C7. The capacitor C7 is charged as a result of the amplified detected rise, and the capacitor C7 thus stores this rise and remembers it.

The NAND gate 50 has two inputs, one from the capacitor C7 via the resistor R29 to the base electrode of the transistor TR14, and the other through the resistor R32 from terminal X of the timer 24. The two outputs of the NAND gate 50 are obtained firstly from the emitter electrode of the transistor TR15 which is fed to the capacitor discharge circuit 20, and secondly from the collector electrode of the transistor TR15 via the resistor R34 to the base electrode of the transistor TR10 which constitutes the canceller for the peak memory circuit. If the transistor TR15 momentarily conducts a command notch down signal is fed to the capacitor discharge circuit and at the same time a negative going signal is applied to the base electrode of the transistor TR10 to cause it to conduct and discharge the peak memory capacitor C6. The rise memory capacitor C7 is discharged when the transistor TR13 conducts on the application of a negative going signal from the timer 24.

This part of the circuit of the third embodiment is designed to detect complete polarization. When complete polarization occurs, a new differential is less in magnitude than a prior differential and this is what must be sensed. The value of a differential must be remembered, and this is achieved by the capacitor C6.

A differential from the output of the operational amplifier OP-A3 is fed via the emitter follower transistor TR9 to charge the capacitor C6 through the diode D7 and the resistor R25 in series. If the ensuing differential is greater than the first, it likewise will be remembered but in so doing the capacitor C6 will be further charged, and for this to happen, a current must flow through the diode D7 and the resistor R25 so generating a detectable voltage thereacross. This detectable voltage which is a rise is utilized to prevent the charging current from being notched down.

If the ensuing differential is not greater than the first, because complete polarization has been reached, the charging current must be allowed to be notched down. The transistor TR10 connected across the capacitor C6 is arranged to discharge the capacitor simultaneously with a notching down of the charging current so that the sensing operation may be repeated.

Any voltage across the diode D7 and the resistor R25 which represents a rise, is fed to the base electrode of the transistor TR11 whose base-emitter drop is largely balanced out by the forward drop of the diode D7, and appears amplified across the collector load resistor R27 whence it is fed via the emitter follower transistor TR12 into the memory capacitor C7 through the diode D8 and the resistor R28 in series. A rise is thus remembered by the capacitor C7 until cancelled by the conduction of the transistor TR13. The emitter output of the transistor TR15 is arranged to cause a partial discharge of the capacitor C upon conduction. The collector output of the same transistor is arranged to forward bias the transistor TR10 also upon conduction. Now, provided that the transistor TR14 is non-conductive, a positive going edge from the timer will cause the transistor TR15 to be pulsed into conduction by the differentiated output of the capacitor-resistor network C8-R30 so that the charging current will ultimately be notched down, and simultaneously the peak memory capacitor C6 will be discharged for the next sensing operation. However, if the rise memory capacitor C7 is charged, the transistor TR14 will be conductive and so prevent the timer edge from entering the capacitor C8 and ultimately preventing the charging current from being notched down.

In order to understand more fully the complex operation of this circuit, let us now examine the logic of the timing of events. Looking at the switching transistor TR4 (FIG. 6), when the timer output is negative (up) the control voltage and hence the charging current is OFF. For convenience the negative going edge of the timer pulses will be referred to as UP/OFF and the positive going edge as DOWN/ON. When the charging current is switched off, the transistor TR8 is pulsed to short-circuit the differentiating resistor R23 and cause a short delay in the act of differentiation to remove the I.R. Drop. The transistor TR13 is momentarily rendered conductive by a differentiated UP/OFF pulse. The capacitor C7 is discharged quickly before the differential is generated to re-charge it. Any rise is thus remembered until the commencement of each OFF period.

A DOWN/ON pulse from the timer 24 will be differentiated by the capacitor C8 and resistor R30 to cause the transistor TR15 to momentarily conduct to quickly notch down the capacitor C at the commencement of each ON period, assuming that the transistor TR14 is non-conductive.

To analyze the operation of the third embodiment we must consider four distinct phases of charging. 1. Initially, when the battery is in the discharged state there will be no Gas Drop as no gassing occurs. Therefore, after extraction of the I.R. Drop by the conduction of the transistor TR8, the resultant differentiated decay of the terminal voltage at the commencement of the OFF period will be substantially zero. There is thus no rise to detect. At this stage of the operation, the bistable 22 holds the capacitor C fully charged and prevents it being notched down by the capacitor discharge circuit 20 every time a positive going edge from the timer 24 is applied to the capacitor C8. 2. As the battery charges up, a stage is reached where gas first starts to be generated. When this happens a differential is detected by the differentiator 30 and the resulting voltage amplified and stored in the capacitor C6. The flow of current in charging the capacitor C6 causes a voltage to be developed across the diode D7 and the resistor R25, which in turn charges the capacitor C7 and sends an output via terminal Y to change the bistable 22 to its other state where it will no longer hold the capacitor C charged. Due to the fact that the capacitor C7 has been charged by the rise it causes transistor TR14 to conduct and effectively blocks the positive going edges from the timer causing any notch down of the charging current. This state of affairs repeats at cyclic intervals, the capacitor C7 being discharged through the transistor TR13 by a differentiated timer pulse in order that a fresh rise can be remembered. The capacitor C6 is not discharged because there is no output from the transistor TR15 so the transistor TR10 is non-conductive. 3. As soon as complete polarization occurs, the differentiated output reaches a peak and then starts to decay. The capacitor C6 is not charged any further and no current flows in the diode D7 and resistor R25. Therefore the capacitor C7 is not charged and the transistor TR14 is rendered non-conductive so that the positive going edge of the timing pulse from the timer 24 can momentarily cause the transistor TR15 to conduct and notch down the charging current. At the same time the capacitor C6 is discharged through the conduction of the transistor TR10. 4. The cycle then repeats, the capacitor C6 being charged and a new rise remembered in the capacitor C7 which inhibits the NAND gate 50. If a reduction in the charging current results in a rise of the differential, the charging current is held at this new level until another peak has been reached, at which stage the charging current is notched down a further stage, and so forth until the minimum value is reached. In each stage of this operation complete polarization is sensed and utilized to notch down the charging current.

All the three embodiments use the differential of the decay of battery terminal voltage due to the Gas Drop to control the magnitude of the charging current.

To summarize:

1. The first embodiment amplifies the differential due to Gas Drop, limits it, stores it with decay, and utilizes it to notch down the charging current when gassing has been detected. 2. The second embodiment amplifies the differential, stores it to energize an AND gate, the timer notching down the charging current when gassing has been detected. 3. The third embodiment amplifies the differential, stores the differential, detects a rise in the next cycle, stores the rise and with the aid of a NAND gate prevents the timer from notching down the charging current until a rise has ceased to be detected.

Where the ratio of charging current control is high, it must be borne in mind that the amount of work done by the high charging current in the early sensing stages is very high per unit time; in fact, if in the extreme case a thin-plate battery which was not fully discharged were put on charge, then the maximum rate of reduction of charging current may not be fast enough with the result that extreme gassing might occur.

If a high ratio of charging current control is required, say for most rapid charging, then the number of sensing operations per unit time should be higher at high charging currents, that is to say the length of the charging periods would preferably be an inverse function of the charging current and may conveniently be an inverse function of the control voltage which controls the charging current to the battery.

Figure 10:
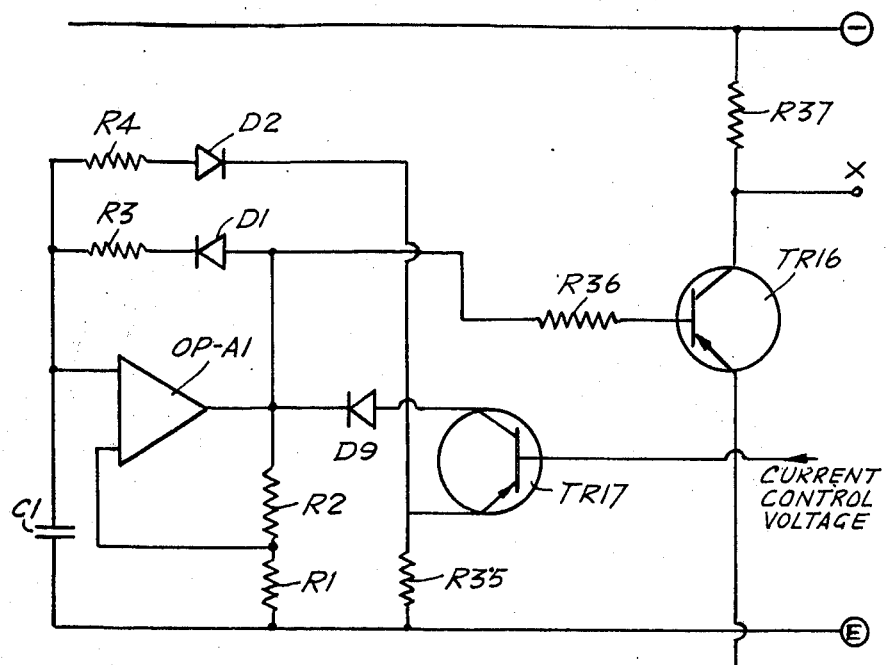
FIG. 10 is a circuit diagram of a second embodiment of a timer for varying the ON time as an inverse function of the magnitude of the charging current.

Convenient means for achieving the latter requirement is illustrated in FIG. 10 which is a modification of the timer circuit shown in FIG. 4. It utilizes two transistors TR16 and TR17, a diode D9 and resistors R35 to R37 in addition to most of the same components, the transistor TR1 and the resistor R5 are omitted.

The output transistor TR16 is now used in the inverting configuration because it is simpler to invert the operation of the operational amplifier and to control its off period than it is to control its on period, that is to say it is simpler to control the duration of the negative output of the operational amplifier because the control voltage for the charging current to the battery is negative going.

The second transistor TR17 is added in emitter-follower configuration across the series load resistors R1 and R2 of the operational amplifier OP-A1. The base potential of the transistor TR17, and hence its emitter potential, is controlled directly by the control voltage for the charging current to the battery. When the said control voltage is low, the battery charging current being low, the voltage applied to the capacitor C1 is low, and hence the rate of charge of the capacitor voltage is reduced and the on time is consequently lengthened. Conversely, when the charging current is high, the on time is shortened. During off periods, the fact that the control voltage is zero is immaterial because the capacitor voltage is then controlled directly by the output of the operational amplifier OP-A1.

The diode D9 which is connected in series with the collector electrode of this time-control transistor TR17 is merely a protection device to prevent the collector electrode of the transistor from being taken positive with the swing of the output of the operational amplifier OP-A1.

Figure 11:
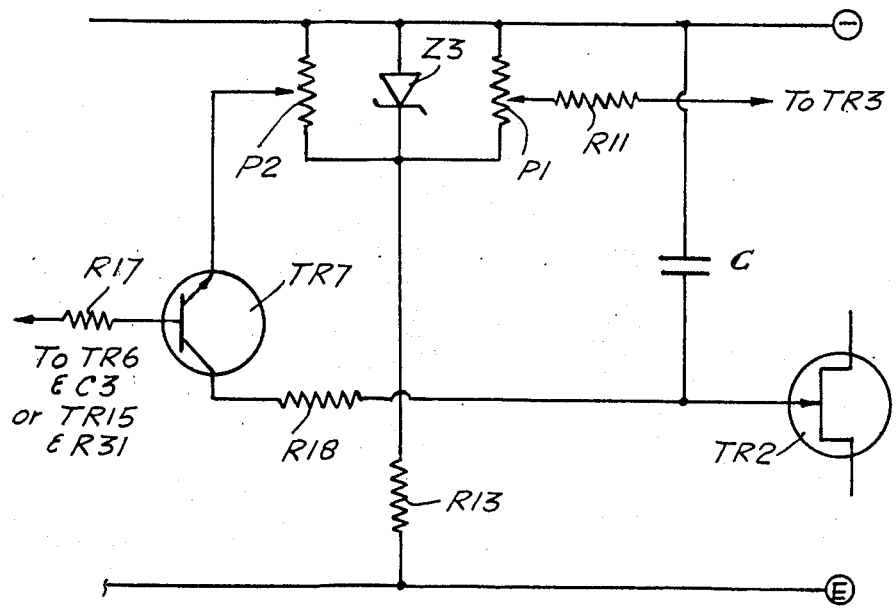
FIG. 11 is a circuit diagram of an alternative form of capacitor discharge stage.

An alternative form of capacitor discharge stage is shown in FIG. 11. The diode string comprising the diodes D5 and D6 is omitted, the resistor R18 being connected directly to the gate electrode of the field-effect transistor TR2 and to the capacitor C. Additionally, the emitter electrode of the transistor TR7 is connected to the slider of a potentiometer P2 which is connected across the zener diode Z3 of the control voltage stage shown in FIG. 6. By varying the position of the slider on the potentiometer, so the minimum voltage to which the capacitor C6 is discharged can be adjusted, being approximately the voltage tapped off the potentiometer P2 plus the collector-emitter voltage of the transistor TR7 in saturation.

Figure 12:
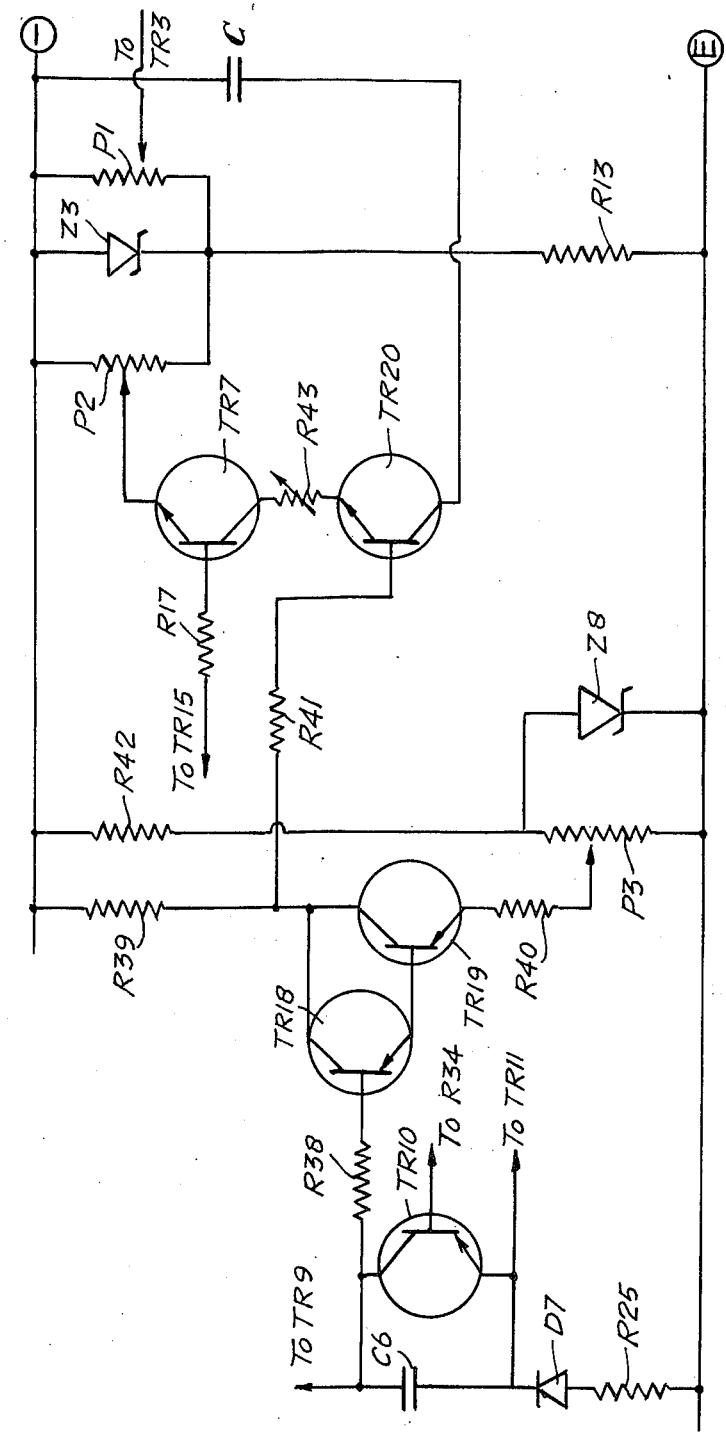
FIG. 12 is a circuit diagram of another alternative form of capacitor discharge stage for use with the third embodiment which senses complete polarization.

A further alternative form of capacitor discharge stage for use in the third embodiment (FIGS. 3 and 9) is shown in FIG. 12. Identical components to those used in FIGS. 6, 7 and 9 have the same reference characters. The circuit additionally includes transistors TR18 and TR20, resistors R38 to R43, potentiometers P2 and P3 and a zener diode Z8. As in the embodiment of FIG. 11, the emitter electrode of the transistor TR7 is connected to the slider of the potentiometer P2 which is in turn connected across the zener diode Z3. The resistor R18 is replaced by the resistor R43, which is manually variable, and the emitter-collector path of the transistor TR20. The transistor TR20 acts as a variable impedance device according to the bias on its base electrode. The base electrode of the transistor TR20 is connected to the output of a Darlington pair, formed by the transistors TR18 and TR19, through the resistor R41. The commoned collector electrodes of the Darlington pair TR18, TR19 are connected to the negative supply terminal through the resistor R39. The emitter electrode of the transistor TR19 is connected to the slider of the potentiometer P3 through the resistor R40. The potentiometer P3 is connected across the zener diode Z8 which is in series with the resistor R42 across the supply. The base electrode of the transistor TR18 is connected to the emitter electrode of the transistor TR10 and to the capacitor C6 through the resistor R38.

The Darlington pair acts as a comparator by comparing the voltage stored across the capacitor C6 with a standard voltage derived across the zener diode Z8. If excessive voltages are being generated due to the differentiation of the Gas Drop, it is desirable that the capacitor C be notched down at a quicker rate than normal in order to reduce the charging current more quickly once gassing has started. Thus, when the voltage stored across the capacitor C6 exceeds a given threshold, the Darlington pair will conduct to apply a more positive voltage to the base electrode of the transistor TR20. This reduces the impedance in the collector-emitter path of the transistor TR20 so allowing a larger discharge current flow from the capacitor C every time the transistor TR7 momentarily conducts.

The threshold at which the Darlington pair conducts can be adjusted by varying the position of the slider on the potentiometer P3. The above circuit thus acts to prevent excessive gassing by notching down the charging current at a faster rate should excessive gassing be detected.

What I claim and desire to secure by Letters Patent is:

1. A control system for a battery charger including: means for switching on and off the charging current at repetitive intervals in order to provide a open circuit terminal voltage during the off periods; means for providing a signal for controlling the magnitude of the charging current; means for varying said signal between a maximum to provide maximum charging current and a minimum to provide minimum charging current; means for extracting the resultant I.R. Drop at the battery terminals; means for differentiating the rate of decay of the open-circuit terminal voltage of the battery at the said repetitive intervals; means for deriving a voltage from said differential during the repetitive intervals, said voltage being a function of gas generation; means for utilizing said voltage derived from the differential to cause said control signal varying means to vary said control signal in order to progressively reduce the magnitude of the charging current once gas generation has commenced.

2. A control system according to claim 1, wherein the voltage derived from the differential is stored with decay, this function being used to control the means for varying said control signal in order to bring about a reduction in charging current once gas generation has been detected.

3. A control system according to claim 1, further comprising an electronic gate, wherein the voltage derived from the differential is stored and utilized to control the electronic gate, the means for switching on and off the charging current also controlling the electronic gate whereby if gas generation has been detected the electronic gate controls the means for varying the control signal in order to bring about a reduction in charging current.

4. A control system according to claim 1, including means for storing the voltage derived from the differential, means for detecting a rise of the differential in the next cycle, means for storing the detected rise, and means for preventing the charging current being reduced as a result of a detected differential due to Gas Drop until the peak differential has been reached.

5. A control system according to claim 1, wherein the means for switching on and off the charging current at repetitive intervals in order to provide an open circuit terminal voltage during the off periods includes: a timer providing positive and negative going outputs at a predetermined frequency and mark space ratio; and a gate for passing the control signal to a charging current control stage when unblocked, the gate being controlled by the output of the timer stage.

6. A control system according to claim 1, wherein the means for providing a control signal includes: a control voltage output stage; a capacitor; and a discharge stage for partially discharging the capacitor from a limit value in each cycle of repetitive on/off intervals thereby forming in the control voltage output stage the desired control signal said discharge stage being controlled to effect the partial discharge of the capacitor by the voltage which is derived from the differential.

7. A control system according to claim 1, wherein the battery terminal voltage is differentiated by means of a capacitor and resistor in series.

8. A control system according to claim 7, wherein the means for extracting the resultant I.R. Drop every time the charging current is switched off includes a transistor, the collector-emitter path of the transistor being connected in shunt with the resistor of the differentiating circuit, and means for applying a biasing pulse to the base electrode of said transistor to cause it to short circuit the resistor every time the charging current is switched off whereby the I.R. Drop across the capacitor is extracted.

9. A control system according to claim 8, wherein the means for switching on and off the charging current at repetitive intervals in order to provide an open circuit terminal voltage during the off periods includes a timer providing positive and negative going outputs at a predetermined frequency and mark space ratio, said output from the timer being connected to the base electrode of the transistor through a capacitor and resistor circuit acting as a differentiator to provide a biasing pulse to cause said transistor to conduct every time the timer switches off the charging current.

10. A control system according to claim 2, wherein the means for deriving said voltage from the differential includes: a comparator; a limiter stage; and a store, connected in cascade between the means for differentiating the rate of decay of said open circuit terminal voltage and the means for utilizing said derived voltage to vary the control signal.

11. A control system according to claim 3, wherein the means for deriving said voltage from the differential includes: a peak memory circuit; an AND gate constituting the electronic gate; and a canceller circuit associated with the peak memory circuit for cancelling the peak voltage remembered in the peak memory circuit during each cycle, said AND gate providing an output to said control voltage varying means.

12. A control system according to claim 11, wherein the canceller circuit is operated from a second output of the AND gate.

13. A control system according to claim 11, wherein the canceller circuit is operated from an output of the means for initiating the switching on and off of the charging current at repetitive intervals.

14. A control system according to claim 4, wherein the means for deriving said voltage from the differential includes: a peak memory circuit; a rise detector and memory circuit; a NAND gate; and first and second canceller circuits, the NAND gate receiving on a first input, the output from the rise detector and memory circuit and on a second input a signal from the means for initiating the switching on and off of the charging current at the repetitive intervals, the NAND gate providing on a first output a signal for said control voltage varying means and on a second output a signal to the first canceller circuit; the first and second canceller circuits being associated with the peak memory circuit and rise detector memory circuit respectively, the second canceller circuit receiving a signal from the means for initiating the switching on and off of the charging current.

15. A control system according to claim 2, wherein the control signal varying means includes a capacitor, a control voltage output stage, and discharge stage for discharging said capacitor in steps, said capacitor when fully charged maintaining, through the control voltage stage, the charging current at a maximum during the on periods, said capacitor discharge stage effecting a discharge of the capacitor in steps once the voltage derived from the differential exceeds a given value.

16. A control system according to claim 15, wherein said capacitor discharge stage includes a transistor and a string of series connected diodes, the emitter-collector path of the transistor being in series with the string of diodes across said capacitor, the derived voltage being applied to the base electrode of said transistor at cyclic intervals corresponding to the repetitive on/off intervals of the charging current in order to cause conduction of the transistor during said decay and hence partial discharge of the capacitor in steps at the repetitive intervals, means being provided for preventing the discharge of the capacitor until the derived voltage has exceeded a given value.

17. A control system according to claim 16, wherein said decay is caused by the provision of a parallel circuit comprising a second capacitor and resistor, means for amplifying the derived voltage, and means for limiting said amplified signal in height before applying it across the second capacitor such that the second capacitor is charged to a fixed level every time a significant differential is present.

18. A control system according to claim 17, wherein said voltage limiting means is a zener diode.

19. A control system according to claim 17, additionally including a transistor which amplifies the excess of the derived voltage applied across its base-collector electrodes.

20. A control system according to claim 16, wherein the means preventing the discharge of the capacitor until the derived voltage has exceeded a given value comprises a bistable circuit, said bistable circuit in one of its states being operative to prevent discharge of the capacitor, said bistable receiving on a first input a negative going pulse, and receiving on a second input a positive going pulse derived from the differential when the derived voltage exceeds a given value; said latter pulse effecting a change of state of the bistable circuit to render it inoperative and thus allowing the capacitor to be discharged in steps at the repetitive intervals.

21. A control system according to claim 15, wherein the control voltage output stage includes a field-effect-transistor and a pair of transistors connected with their emitter-collector paths in series with one another and with a resistor, the control signal being derived across said resistor, the base electrode of one transistor receiving a signal from a timer means in order to effect the switching on and off of the charging current at said repetitive intervals, the base electrode of the second transistor receiving a signal from the field-effect-transistor representative of the amount by which the capacitor has been discharged in order to proportionally reduce the current flow through the pair of transistors and hence said resistor so as to reduce the control signal for the charging current.

22. A control system according to claim 14, wherein the peak memory circuit comprises a capacitor, diode and resistor in series with one another and in series with the emitter collector path of a transistor whose base electrode receives the derived voltage from the differential, a rise beyond the previous peak being detected due to the fact that the capacitor must be further charged in each cycle of on/off operation.

23. A control system according to claim 22, wherein the first canceller circuit comprises a transistor whose collector-emitter path is connected across the capacitor, the base electrode receiving a signal from the NAND gate to cause the conduction of the transistor and hence discharge the capacitor once complete polarization has been detected.

24. A control system according to claim 14, wherein the rise detector and memory circuit include a pair of transistors, a diode and a capacitor, the transistors amplifying and voltage in excess of the peak detected at the previous cycle, the capacitor storing the detected rise.

25. A control system according to claim 24, wherein the second canceller circuit comprises a transistor whose collector-emitter path is connected across the capacitor, the base electrode receiving a pulse from a timer circuit controlling the switching on and off of the charging current in every cycle of operation.

26. A control system according to claim 15, wherein said capacitor discharge stage includes a transistor and a potentiometer whose tap is connected to the collector-emitter path of the transistor, so that at least one part of the potentiometer is in series with the collector-emitter path of the transistor across the capacitor, a zener diode being connected across the extremities of the potentiometer, the derived voltage being applied to the base electrode of said transistor at cyclic intervals according to the repetitive on/off intervals of the charging current in order to cause conduction of the transistor during said decay and hence partial discharge of the capacitor in steps at repetitive intervals, the minimum voltage to which the capacitor can be discharged being determined by the position of the tap on the potentiometer.

* * * * *